United States Patent [19]

Swartz

[11] Patent Number: 4,940,131
[45] Date of Patent: Jul. 10, 1990

[54] MATERIAL HANDLING SYSTEM AND CONTROL VALVE THEREOF

[75] Inventor: Roy Swartz, Muncy, Pa.

[73] Assignee: Delaware Investments, Inc., Wilmington, Del.

[21] Appl. No.: 437,298

[22] Filed: Nov. 16, 1989

Related U.S. Application Data

[63] Continuation of Ser. No. 192,916, May 12, 1988, abandoned.

[51] Int. Cl.⁵ ............................................. B65G 31/04
[52] U.S. Cl. .................................. 198/524; 198/639; 198/642; 406/30; 406/33
[58] Field of Search ............... 198/532, 641, 642, 524, 198/639; 406/128, 129, 130, 30, 32, 33; 222/317, 368, 636

[56] References Cited

U.S. PATENT DOCUMENTS

| | | | |
|---|---|---|---|
| 309,920 | 12/1884 | Bird | 198/530 |
| 663,902 | 12/1900 | Hutchison | 222/317 |
| 824,056 | 6/1906 | Akers | 198/532 X |
| 1,325,589 | 12/1919 | Smith | 198/532 |
| 2,020,871 | 11/1935 | Beers | 198/642 |
| 2,029,403 | 2/1936 | Andreas | 198/642 X |
| 2,401,684 | 6/1946 | Gumilar | 222/317 |
| 2,566,210 | 8/1951 | Kendall et al. | 406/33 X |
| 2,886,216 | 5/1959 | Oholm | 222/368 |
| 2,898,158 | 8/1959 | Pollock | 406/32 |
| 2,899,111 | 8/1959 | Christensen | 222/368 |
| 3,270,921 | 9/1966 | Nadolske et al. | 222/368 |
| 3,369,677 | 2/1968 | Mylting | 222/368 |
| 3,403,942 | 10/1968 | Farnworth | 222/368 |
| 3,797,890 | 3/1974 | Walters | 406/33 |
| 3,876,187 | 4/1975 | Waltman | 198/532 X |
| 4,059,310 | 11/1979 | Waskiewicz et al. | 406/30 |
| 4,111,493 | 9/1978 | Sperber | 198/532 X |
| 4,155,486 | 5/1979 | Brown | 222/368 X |
| 4,231,495 | 11/1980 | Lund | 222/368 X |

*Primary Examiner*—Robert J. Spar
*Assistant Examiner*—D. Glenn Dayoan
*Attorney, Agent, or Firm*—Lalos & Keegan

[57] ABSTRACT

A rotary valve for use in a particulate material handling system having an elevated device for holding a supply of the particulate material, a lower material receiving device and a remote control device. The rotary valve includes a housing having a rotor chamber, a side inlet communicating with the rotor chamber, a lower outlet communicating with the rotor chamber and communicable with the material receiving device, a rotor journalled in the rotor chamber having a plurality of radially disposed vanes and a slide valve disposed in the inlet for controlling the flow of material therethrough. The slide valve is operatively connected to the remote control device and is operated in response to the operating conditions sensed by sensing devices which are connected to the remote control device.

8 Claims, 2 Drawing Sheets 4,940,131

MATERIAL HANDLING SYSTEM AND CONTROL VALVE THEREOF

This is a continuation of co-pending application Ser. No. 07,192,916 filed on May 12, 1988 now abandoned.

BACKGROUND OF THE INVENTION

This invention relates to a material handling system and more particularly to a system for handling particulate materials. The invention further contemplates a control valve for such a system which is operative to both control the flow of product in the system and assure the quality of the product being processed.

DESCRIPTION OF THE PRIOR ART

In the prior art, there has been developed type of a system for handling particulate materials such as plastic pellets and the like which generally consists of an elevated vessel such as a bin, hopper or blender in which the material to be processed is deposited, a vessel such as a storage bin, hopper or railway car into which the material is to be deposited, a conduit for pneumatically conveying the product from the elevated vessel to its receiving vessel, and a rotary valve for feeding the product through gravity flow from the elevated vessel into the pneumatic conveying conduit. Typically, the rotary valve functions to provide a uniform feed of product into the pneumatic conveying conduit, control the amount of product fed into the conveying conduit and provide an air seal between the elevated vessel and the pneumatic conveying conduit so as to assure a proper flow of product in the conveying conduit. It further has been the practice in the manufacture of such valves to provide a side inlet for the product being gravity fed therein and to provide a slide valve to control the flow of material therethrough. Generally, the slide valve is manually operable so that whenever an adjustment of the flow rate of the valve is desired, an operator is required to proceed to the process area and manually operate the valve.

It has been found that the requirement of the manual operation of the flow control valve and system of the type described can be detrimental to the operation of such systems and the maintenance of desired quality standards. If precise control of the product may be required, or the valve or conveying line of the system may become clogged or blocked, or the material may be damaged by shearing or deformation, a delay in response time in having an operator detect the unwanted or flawed condition in the system, physically proceed to the processing area and making a corrective adjustment to the feed valve, can result in damage to not only the product being process but the components of the system.

In valves of the type described, the flow rate of the material is controlled by the speed of the rotor and the size of the inlet opening determined by the position of the slide valve. In the use of such valves, when the valve is turned off, the rotor stops rotating and the valve usually is left in the opened position. Under such conditions, product in the elevated vessel will continue to flow through the inlet of the valve an completely fill one of the pockets in the rotor registered with the inlet of the valve. With the rotor pocket thus completely filled with product, when the system is reactivated and the rotor of the valve begins to turn, material in the filled pocket of the rotor will become pinched or jammed between the trailing vane of the pocket and the wall of the valve housing causing shearing or other forms of damage to the product and undue wear on the valve.

It thus has been found to be desirable to provide a product handling system of the type described and a rotary valve for use in such a system that are operable to obviate the aforementioned problems.

SUMMARY OF THE INVENTION

Accordingly, it is the principal object of the present invention to provide an improved material handling system.

Another object of the present invention is to provide an improved system for handling particulate materials such as plastic pellets and the like.

A further object of the present invention is to provide an improved system for conveying particulate materials of different particle sizes and compositions which will freely flow through the system without damage to the material itself or the components of the system.

Another object of the present invention is to provide an improved system for pneumatically conveying particulate materials at controlled flow rates therethrough without alteration or damage to the product being processed, or interruption, interference or damage to the system.

A further object of the present invention is to provide an improved system for metering and conveying bulk quantities of deformable pellets such as plastic pellets at controlled flow rates and without shearing or otherwise deforming the pellets.

Another object of the present invention is to provide an improved rotary valve.

A further object of the present invention is to provide an improved rotary valve adapted for use in a material handling system.

A still further object of the present invention is to provide an improved rotary valve adapted for use with a material handling system which is operative to rapidly and effectively adjust the flow rate of the material being processed in the system.

Another object of the present invention is to provide an improved rotary valve adapted for use with a material handling system which is effective in controlling the flow rate of the material being processed without causing damage to such material.

Other objects and advantages of the present invention will become more apparent to those persons having ordinary skill in the art to which the present invention pertains from the following description taken in conjunction with the accompanying drawings wherein:

DESCRIPTION OF THE PREFERRED EMBODIMENT

Figure 4:
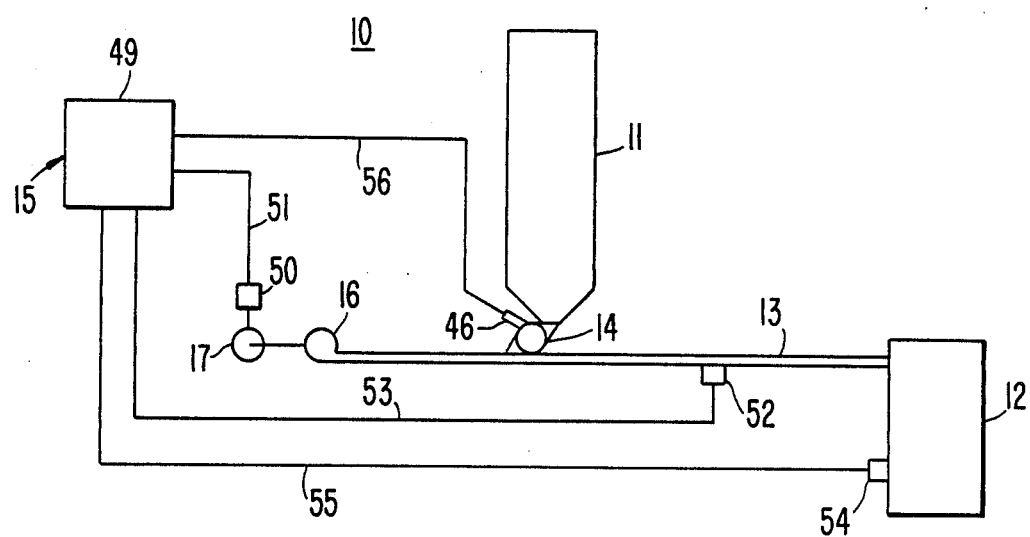
FIG. 4 is a diagrammatic view of a material handling system embodying the present invention, utilizing the type of valve shown in FIGS. 1 through 3.

Referring to FIG. 4 of the drawings, there is illustrated a material handling system 10 generally including an elevated vessel 11 adapted to hold a product to be processed, a vessel 12 into which the product is to be deposited, a pneumatic conveying line 13 for conveying product from the elevated vessel 11 to the receiving vessel 12 a rotary valve 14 for controlling the gravity flow of product from the elevated vessel 11 to the pneumatic conveying line 13 and a control system 15. Elevated vessel 11 may consist of a storage bin, a hopper or a blender in which one or more materials may be deposited to be fed into the system. Receiving vessel 12 may consist of a storage bin, a hopper, a blender or other vessel for further processing the product or a railway car. Pneumatic conveying line 13 may be provided with either a positive or negative pressure for the purpose of inducing flow of material fed into the line by rotary valve 14. In the system as shown, there is provided a blower 16 driven by an electric motor 17 for providing a positive pressure in the conveying line.

Figure 3:
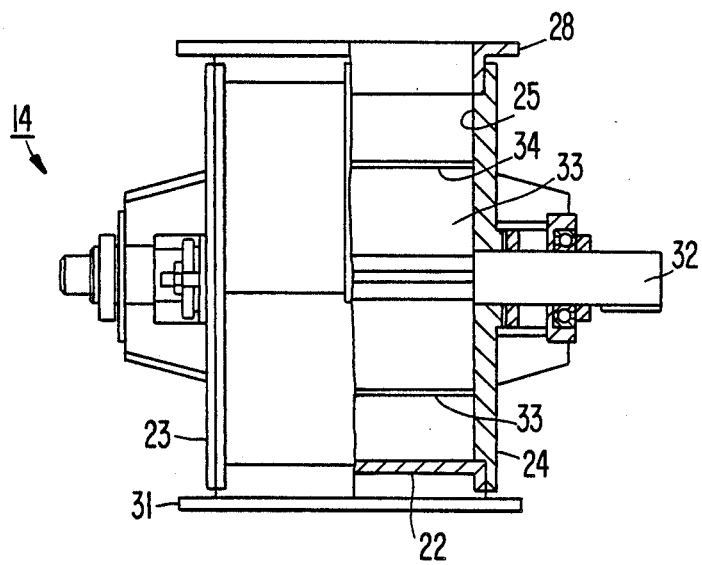
FIG. 3 is an end elevational view of the valve shown in FIGS. 1 and 2.
Figure 1:
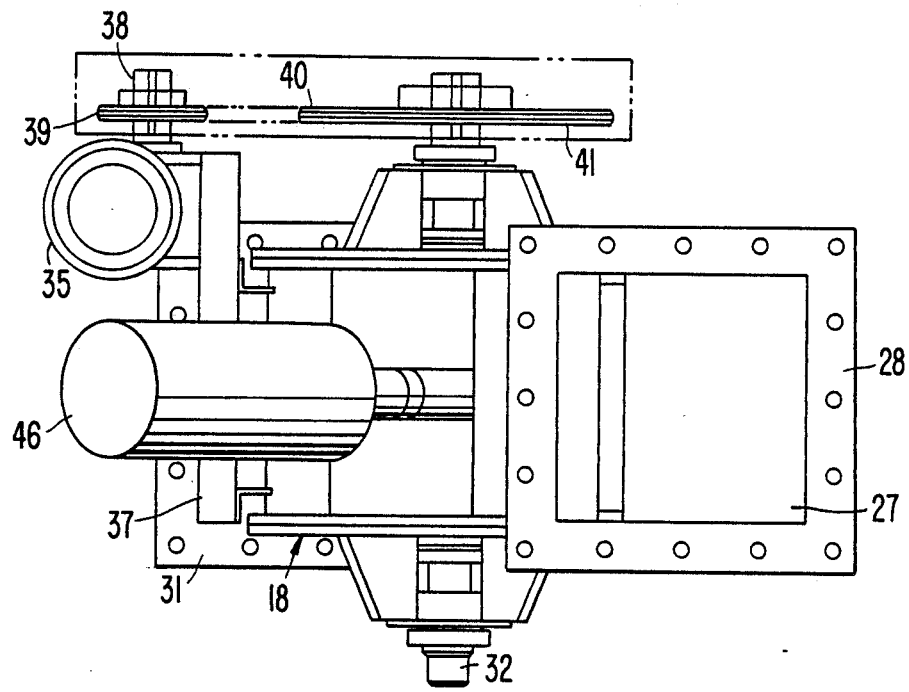
FIG. 1 is a top plan view of a rotary valve embodying the present invention.
Figure 2:
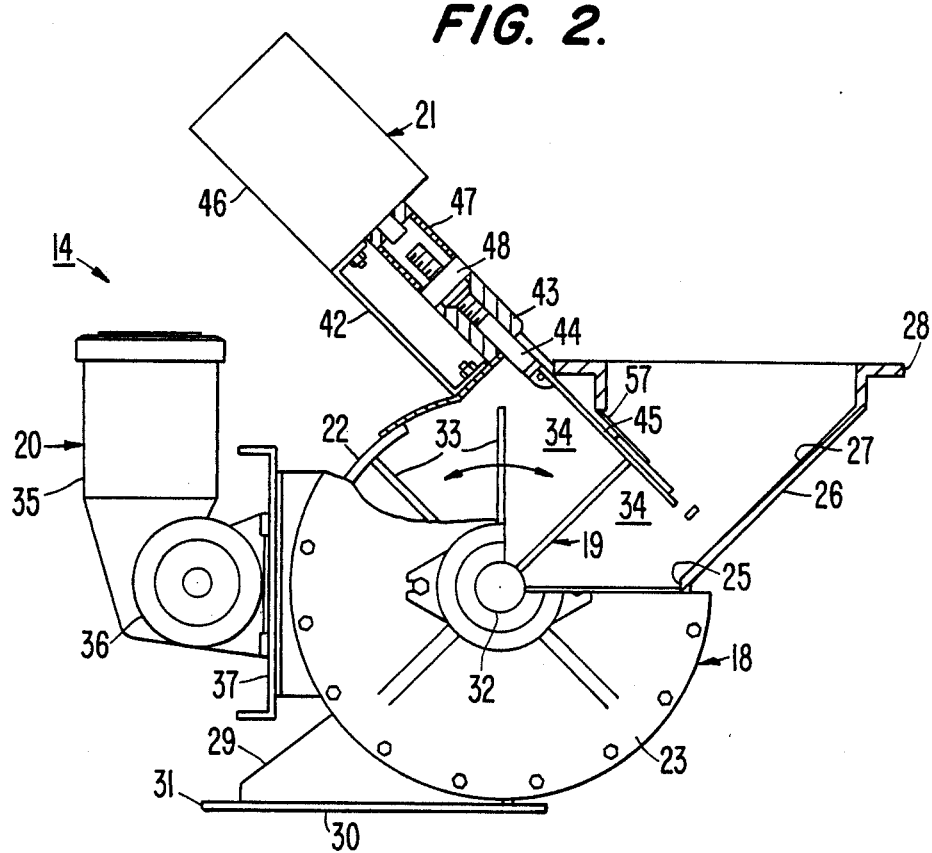
FIG. 2 is a side elevational view of the valve shown in FIG. 1, having a portion thereof broken away.

Rotary valve 14 is illustrated in greater detail in FIGS. 1 through 3. The valve generally consists of a housing 18, a rotor 19 mounted in the housing, a drive mechanism 20 for the rotor mounted on the housing and a slide valve assembly 21 also mounted on the housing and cooperating with the rotor. The housing includes a cylindrical side wall 22 having a pair of diametrically opposed openings and a pair of end walls 23 and 24 defining a rotor chamber 25. Mounted on an upper end of housing side wall 22 is a material guide section 26 defining an inlet 27 communicating with the rotor chamber through the opening provided in housing side wall 22. Guide section 26 is provided with a peripheral flange 28 which is adapted to be secured to a mating flange of elevated vessel 11 by bolts or other suitable fasteners so that material deposited in the elevated vessel will gravity flow through inlet 27 into the rotary chamber. The housing similarly is provided with a material guide section 29 mounted on housing side wall 22 which defines an outlet 30 communicating with the rotor chamber. Guide section 29 further is provided with a lower, peripheral flange 31 which is adapted to be secured to a mating flange of pneumatic conveying line 13 or an intermediate coupling member for discharging material from the rotary valve into pneumatic conveying line 13.

Rotor 19 includes a shaft 32 journaled in suitable bearings mounted in end walls 23 of the housing, and a plurality of radially disposed vanes 33 defining a plurality of circumferentially spaced product receiving pockets 34. In the conventional manner of operation, as the rotor is rotated in a counter-clockwise direction relative to FIG. 2, material gravity flowing through inlet 27 will be deposited in a pocket 34 disposed in registry with the inlet, be carried around and through the rotor chamber and discharged through outlet 30 into the pneumatic conveying line. Because of the side entry of the product into the rotor pockets, the rotor pockets will not be filled to capacity which could have the effect of having some of the material at the outer ends of the pockets becoming pinched or jammed between the ends of trailing vane and housing side wall 22.

Drive mechanism 20 includes a variable speed electric motor 35 and a gear reduction unit 36 mounted on a bracket 37 which is secured to housing 18. As best shown in FIG. 1, drive is transmitted from the gear reducer to the rotor by means of a gear reducer output shaft 38, a drive pulley 39, a drive chain 40 and a driven pulley 41 mounted on the shaft of the rotor. Electric motor 20 may be operated at different speeds to vary the speed of rotor 19.

Slide valve assembly 21 includes a support bracket 42 mounted on housing side wall 22 and a guide member 43 mounted on the support bracket. A threaded actuating rod 44 is slidably mounted in the guide member 43 and a gate member 45 is mounted on the end of the actuating rod and displaceable across inlet opening 27. Baffle wall 57, disposed in inlet opening 27, provides a restricted passageway in the inlet. As illustrated in FIG. 2, baffle wall 57 is disposed between the plane of gate member 45 of sliding valve 21 and the outer end of inlet 27. Baffle wall 57 is disposed adjacent and substantially parallel to the plane in which slide valve 21 is displaceable. The gate is displaceable along its length by means of a reversible, variable speed electric motor 46 having a cylindrical output shaft 47 provided with an internally threaded element 48 threaded on the threaded end of actuating rod 44. It will be appreciated that as electric motor 46 is operated to turn output shaft 47, the threaded connection between the motor output shaft and actuating rod 44 will translate the rotary motion of the motor output shaft to linear motion of the actuating rod to linearly displace gate 45.

As shown, inlet and outlet openings 27 and 30 are disposed substantially 45° relative to the axis of rotor shaft 32, and the plane of displacement of gate 45 is disposed substantially tangentially relative to the circle circumscribed by the ends of vanes 19 as they rotate, and substantially perpendicular to the orientation of the inlet and outlet openings of the valve.

The flow rate of rotary valve 14 is controlled by controlling the speed of the rotor and/or the displacement of the slide valve. For different sizes and compositions of materials and for different processes, the flow rate of the rotary valve may be adjusted as desired.

Control system 15 includes a remote control unit 49 which is operable to sense certain operating conditions of the material handling system and correspondingly control the operation of motor 46. It is operable to sense the load on blower motor 17 by means of an ammeter 50 and an electrical transmission line 51, the load conditions in pneumatic conveying line 13 by means of a fluid flow or pressure sensor 52 and an electrical transmission line 53 and the level or weight of material deposited in vessel 12 by means of a pressure sensor 54 and an electrical transmission line 55. Responsive to system conditions as determined by the various sensors and the feedback signals transmitted on lines 51, 53 and 55, motor 46 can be energized and driven in opposite directions through an electrical line 56 to extend or retract valve gate 45 to vary the area of inlet 27. Additionally, the speed of rotor 19 may be controlled by remote control unit 49.

Remote control unit 49 may consist of any conventional mechanism. It may consist of an appropriate number of electromechanical switches which may be operated by an operator, it may consist of an automated switching system or a programmable computer. Appropriate displays may be provided on the control unit to permit an operator to monitor the sensed system conditions and activate motor 46 and/or motor 35 in accordance with predetermined operating specifications. Such specifications will vary with the type of product being processed and the specific handling equipment being utilized. Alternatively, the control unit may be automated or programmed using a conventional microcomputer (e.g., a Motorola Model 6805). The microcomputer can be programmed using well known, conventional programming techniques to provide predetermined sets of control output signals in response to sensed input signals indicating sensed system conditions In any event, it would provide for detecting a faulty condition in the system and provide for either manual or automatic operation of the displacement of the slide valve and/or an adjustment of the speed of the rotor to control the flow rate of material being fed by the rotary valve into the pneumatic conveying system. The adjustment of the operation of the rotary valve will be instantaneous so that any faulty condition in the system will be addressed promptly to avoid damage to the product, an interruption of the process or possible damage or undue wear of the components of the system.

In shutting down the system as described, it is contemplated that the rotor will continue to be operated as the slide valve is completely closed by operating suitable controls in the remote control unit. After the slide valve is completely closed so as to prevent the flow of any further material into the pockets of the rotor, the rotor motor is then de-energized. Under such conditions, no product will be deposited in the pockets of the rotor when it is next started up. When it is desired to operate the system again, the rotor motor is first energized to rotate the motor and then the slide valve is opened to permit material to gravity flow into the pockets and be transported through the valve and discharged into the pneumatic conveying line. With the rotor pockets empty when the rotor begins to rotate, there will be no material which can be caught between the ends of the rotor vanes and the side wall of the housing resulting in a shearing of the material and possible undue wear on the components of the valve.

Although the aforementioned embodiment has been described in terms of the use of an electrically operated rotary actuator, it is to be understood that other types of actuators can be used for displacing the valve gate which can be operated from a remote control unit. Another form of actuator which may be employed is a pneumatic piston actuator which would utilize an electrically controlled valve for supplying air under pressure to opposite ends of the cylinder to displace the piston.

In the operation of the system as described in the fully automated mode, with the gate valve fully closed and the material to be processed deposited in the elevated vessel, blower motor 17 and rotor motor 35 are energized to operate blower 16 and rotate rotor 19. With no material deposited in pockets 34, the rotor will turn freely and in a condition to receive product from the elevated bin. Slide valve motor 36 is then energized to retract the valve gate and allow material to gravity flow into rotor pockets 34 and to be conveyed through the valve and discharged into the pneumatic conveying line. If the flow rate of material through valve 14 is less than optimal or material becomes clogged in either valve 14 or line 13, such condition will be sensed either by current sensing device 50 which would sense the load on blower motor 17 or by sensor 52 which would sense the flow rate or pressure in line 13. Under such conditions, a corrective signal will be transmitted to slide valve motor 46 and/or rotor motor 35 to adjust the area of the inlet opening and/or the speed of rotor 19 to remedy the faulty condition. Signals from sensor 54 also will provide an indication of the amount or level of product deposited in vessel 12 to either continue or discontinue the operation of the system as described. If the desired level or weight of product in vessel 12 is sensed, the control unit will function to discontinue the operation of the system as previously described.

From the foregoing detailed description, it will be evident that there are a number of changes, adaptations and modifications of the present invention which comes within the province of those persons having ordinary skill in the art to which the aforementioned invention pertains. However, it is intended that all such variations not departing from the spirit of the invention be considered as within the scope thereof as limited solely by the appended claims.

I claim:

1. A rotary valve adapted for use in a particulate material handling system having an elevated means for holding a supply of said particulate material, a lower material receiving means and a remote control means, comprising:

a housing having a rotor chamber, a side inlet communicating with said rotor chamber and communicable with said material holding means and a lower outlet communicating with said rotor chamber and communicable with said material receiving means;

a rotor journalled in said rotor chamber having a plurality of radially disposed vanes defining a plurality of circumferentially spaced pockets registrable with said side inlet and lower outlet;

means for driving said rotor whereby each of said pockets will register with said inlet to receive therein material gravity fed through said inlet, rotate through said rotor chamber and register with said outlet to discharge material therefrom;

a slide valve disposed in said inlet for controlling the flow of material therethrough;

said side inlet having a lower material guiding wall disposed at an angle of 45° relative to a plane passing through the axis of rotation of said rotor;

said slide valve being displaceable in a plane disposed tangentially relative to a vane of said rotor and normal to said lower material guiding wall of said side inlet; and means operatively connectable to said remote control means for operating said slide valve whereby when said remote control means is operated said side valve operating means will function to displace and said slide valve relative to said material guiding wall to correspondingly control the flow of material from said inlet into the pockets of said rotor and through said valve, said remote control means connected to sensing devices for sensing operating conditions of said material handling system, and said slide valve being operated in response to said sensed conditions.

2. A rotary valve according to claim 1 including a baffle wall disposed in said side inlet, having an end portion spaced from said material guiding wall to provide a restricted passageway in said side inlet.

3. A rotary valve according to claim 2 wherein said baffle wall is disposed between the plane of said sliding valve and an outer end of said side inlet.

4. A rotary valve according to claim 2 wherein said baffle wall is disposed adjacent and substantially parallel to the plane in which said slide valve is displaceable.

5. A rotary valve according to claim 1 wherein said side inlet and lower outlet are displaced substantially 180° apart relative to the axis of said rotor.

6. A rotary valve according to claim 1 wherein said slide valve operating means comprises an electrically operable rotary actuator electrically connectable to said remote control means.

7. A rotary valve according to claim 6 including means for translating the rotary motion of said rotary actuator to linear motion of said slide valve.

8. A rotary valve according to claim 7 wherein said motion translating means comprises a threaded connection.

* * * * *